J. D. POPE.
Corn-Planter.

No. 200,087. Patented Feb. 5, 1878.

ATTEST:
Chas. Hall
Chas. J. Gooch

INVENTOR:
Joseph D. Pope
By Knight & Bro.
Attys.

UNITED STATES PATENT OFFICE.

JOSEPH D. POPE, OF CALDWELL COUNTY, MISSOURI.

IMPROVEMENT IN CORN-PLANTERS.

Specification forming part of Letters Patent No. 200,087, dated February 5, 1878; application filed August 8, 1877.

*To all whom it may concern:*

Be it known that I, JOSEPH D. POPE, of Caldwell county, Missouri, have invented certain new and useful Improvements in Corn-Planters, of which the following is a full, clear, and exact description, reference being had to the accompanying drawings, making part of this specification.

My planter belongs to that class of corn-planters called "check-row corn-planters," because they are constructed to plant the corn in rows extending in both directions, or in checkers.

My improvement consists in the hereinafter-described combination of parts for the accomplishment of this purpose.

Figure 1:
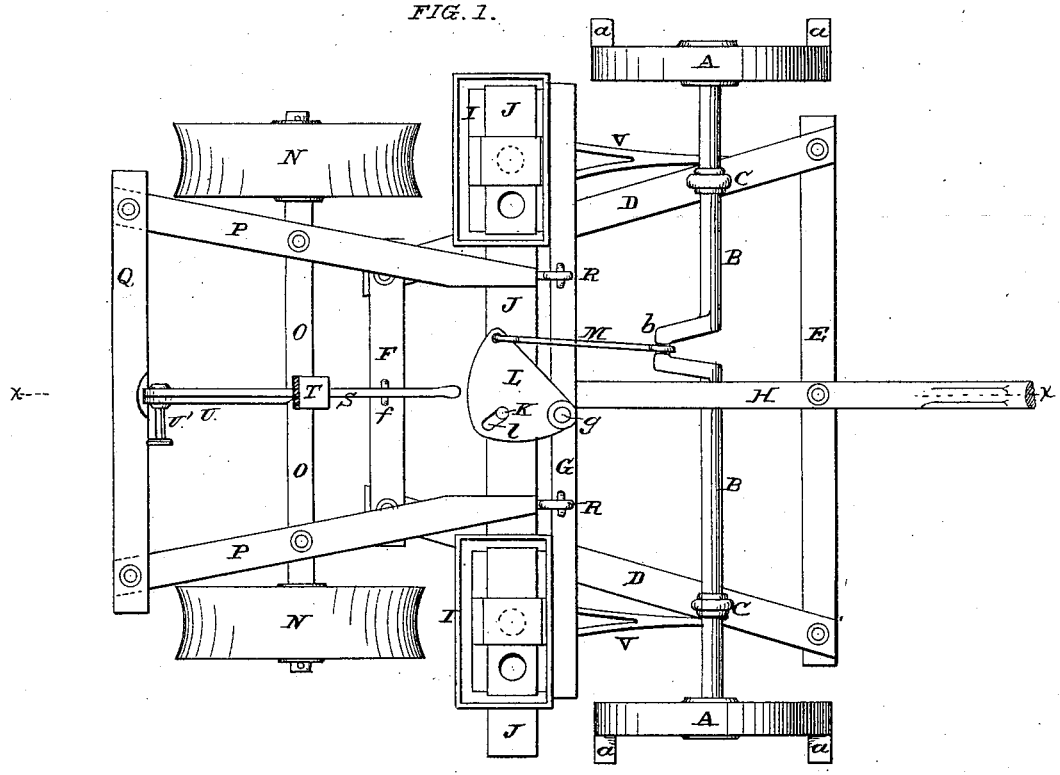
Figure 2:
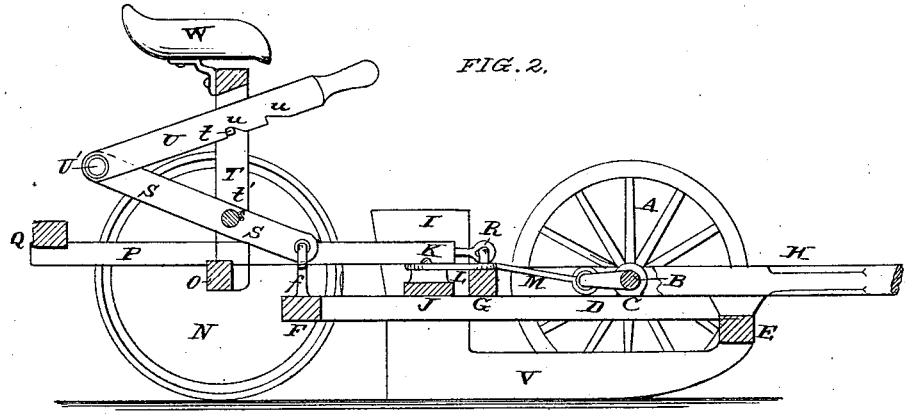

In the drawings, Figure 1 is a top view of my invention with the seat removed. Fig. 2 is a longitudinal section at *x x*, Fig. 1.

The planter has two main frames, one before the other, and having hinge-connection. The front frame is supported on wheels A, say about eight feet, or double the row distance, asunder, and fixed to a shaft-axle, B, which turns in boxes C secured to the oblique frame-bars D D. The bars D are connected together at the front and rear by transverse bars E F, to the former of which, and to a central cross-bar, G, the tongue H is attached. The seed-boxes I are attached to the bars D and G, and are of a usual construction, having a hole through the bottom, above which is the seed-slide, provided with a seed-hole, that is brought by the endwise reciprocation of the slide J in conjunction with the discharge-hole of the seed-box, so as to discharge the seed for the hill through the latter. At the middle of the seed-slide is a pin, K, which works in the slot *l* of the oscillating plate L, said plate being fulcrumed upon a pin, *g*, upon the bar G. The plate receives its oscillatory motion from a crank, *b*, on the axle B by means of a connecting-rod, M, connecting the said plate and crank.

Upon the wheels A are marking-blocks *a*, which make an impression between the rows of corn that are being planted, and in line with the rows extending transversely thereto.

The rear frame or truck is supported on wheels N, which run in line with the dropping-holes of the seed-boxes, so as to compact the earth on the hills. The wheels N turn loosely upon an axle, O, that is attached to the bars P. The rear ends of the bars P are attached together by a transverse bar, Q, and the fore ends are connected to the bar G by hinges R.

*f* is a staple on bar F, which passes through the fore end of a lever, S, fulcrumed at *s* in a standard, T. To the rear end of the lever S is hinged a bar, U, having notch or notches *u* at the under side to engage a transverse pin, *t*, extending across the slot *t'* in the standard, in which the bar U plays. The purpose of this bar is to hold down the back end of the lever S by engagement of notch *u* on pin *t* when the said end has been depressed, so as to hold up the rear end of the fore truck, which is then supported clear of the ground upon the fore end of the lever S and the fore end of the tongue.

When the fore truck is raised the wheels A are not in contact with the ground, and then the machine can be turned upon the two wheels N, or moved from place to place, or turned around, without causing the movement of the seed-bar. Also, the wheels A may be turned by hand to bring the seeding device in the proper position to start at the beginning of the row, (the block *a* being brought over the points made by the block in planting the two previous rows.) V is the furrow-openers. W is the driver's seat.

The operation is as follows: All of the wheels are supposed to be on the ground, as shown in the figures, and as the planter is pulled forward the seed is dropped at distances of four feet apart, more or less, the seed-furrows being opened for the seed and the earth dropped back upon it, when it is compacted by the wheels N, which are, preferably, concave-faced for the performance of this office in the best manner. When the end of the rows is reached the wheels A and the openers V may be lifted from the ground by forcing down the rear end of the lever S, and thus lifting the front end, which lifts up the rear end of the front truck, when the notched bar U engages the pin *t* and holds the lever S in this position. The planter may then be readily turned around in line for two furrows.

It will then be found that the places of dropping will not be in transverse line with those of the last rows. Then the wheels A, which are raised from the ground, are turned until one of the blocks upon the wheel next to said rows is just over the print left by the block in the last throw, and then the bar U is lifted at the upper end, so as to disengage its notch $u$, and the front truck descends.

The places of planting may be thus rectified at any time, if disarranged from an obstruction or other cause. The rear end of lever S may be depressed by a treadle-pin, U'.

I claim as my invention—

The combination of the wheels A A, constructed with markers $a$ $a$, crank-shaft B $b$, rod M, and horizontal slotted plate L $l$, all arranged substantially as and for the purpose set forth.

JOSEPH D. POPE.

Witnesses:
B. F. BOCKETT,
SAML. KNIGHT.